Figure 2:
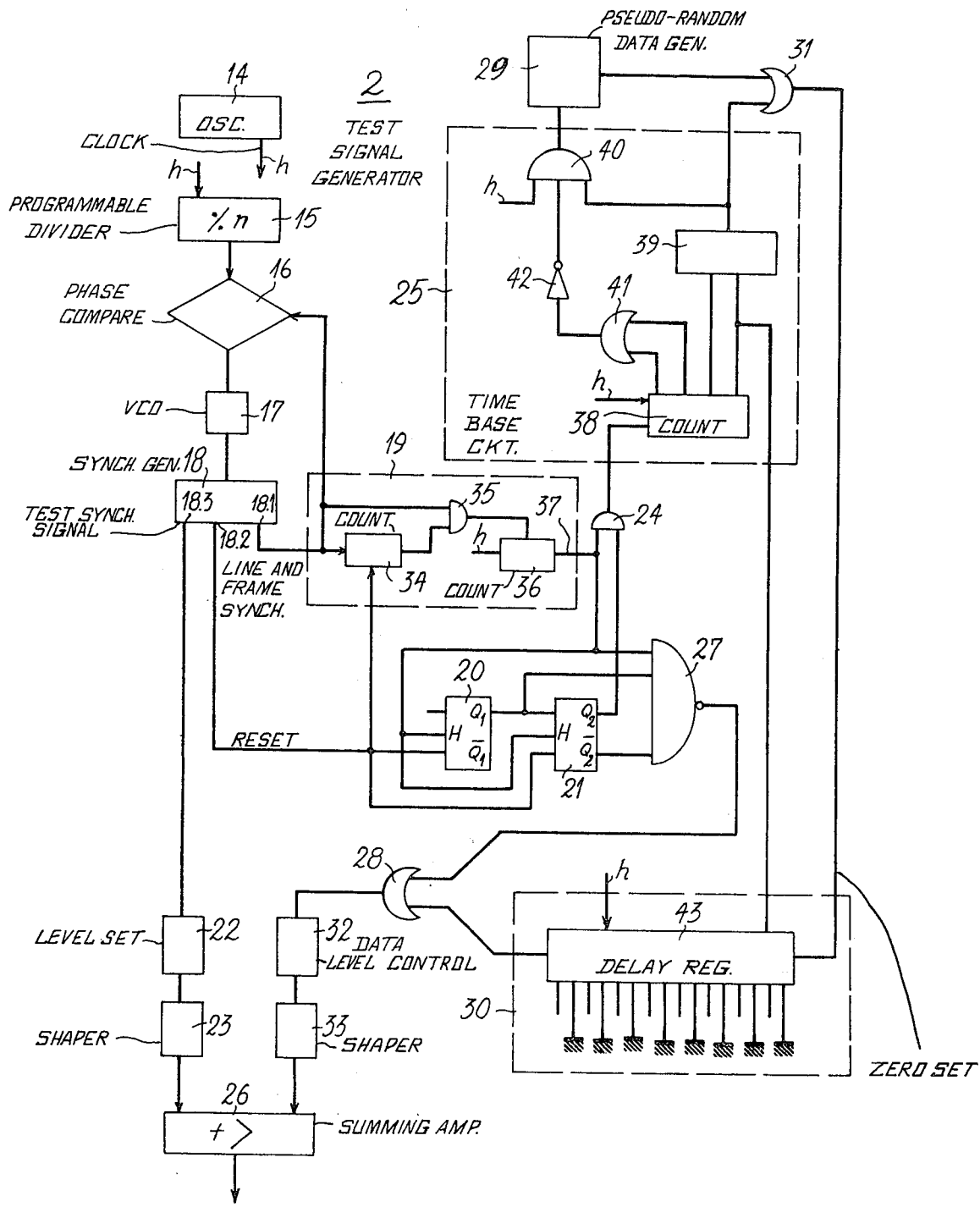

United States Patent [19]

Noirel et al.

[11] 4,377,822

[45] Mar. 22, 1983

[54] TEST EQUIPMENT FOR A TELETEX TELEVISION RECEIVER

[75] Inventors: Yves M. Noirel, Montfort; Joseph Blineau; Pierre Leray, both of Rennes; Jean-Pierre Bauduin, Combourg, all of France

[73] Assignees: L'Etat Francais, Represente par le Secre-d-Etat aux Postes et Telecommunications; et a la Telediffusion Centre National, both of France

[21] Appl. No.: 205,942

[22] Filed: Nov. 12, 1980

[30] Foreign Application Priority Data

Nov. 22, 1979 [FR] France .................. 79 29335

[51] Int. Cl.³ .................. H04N 7/02; H04N 9/62
[52] U.S. Cl. .................. 358/139; 328/162; 370/13; 370/17; 375/10; 455/9
[58] Field of Search .............. 358/139; 455/9; 375/10; 370/13, 17; 179/175.3 R; 328/162

[56] References Cited

U.S. PATENT DOCUMENTS

| | | | |
|---|---|---|---|
| 3,898,564 | 8/1975 | Waldhauer | 455/9 |
| 4,097,697 | 6/1978 | Harman | 179/175.3 R |
| 4,204,228 | 5/1980 | Mason | 358/139 |
| 4,246,608 | 1/1981 | Baker | 375/10 |

FOREIGN PATENT DOCUMENTS

2655133 3/1976 Fed. Rep. of Germany .
2390862 4/1978 France .

OTHER PUBLICATIONS

NHK Laboratories Note, No. 216, Sep. 1977, pp. 1–13.
Nachrichtentechnische Zeitschrift, vol. 30, No. 3, Mar. 1977, pp. 225–228.
IEEE Transactions on Consumer Electronics, vol. CE-25, No. 3, Jul. 1979, pp. 304–310.

*Primary Examiner*—Howard Britton
*Attorney, Agent, or Firm*—Laff, Whitesel, Conte & Saret

[57] ABSTRACT

This test equipment permits a testing of the demodulator of a teletex television receiver. It consists of a digital test signal generator, the output of which is connected to the HF input of the television, and a receiver, the input of which is connected to the video output of said receiver. The generator tramsmits pseudo-random data packets having a first frequency of binary elements, with two double-intervaled binary elements at two predetermined instants $t_1$ and $t_2$ for each packet. The receiver has a data regeneration circuit whose threshold varies line by line from a maximum value to a minimum value. The sampling clock of the receiver is at a second frequency lower than the first by the ratio $(n-2)/n$, where n is equal to the integral ratio of the first frequency to the line frequency of the television. A suitable means insures resynchronization of the sampling clock at the middle of each line. A receiving circuit for the pseudo-random data detects the errors which are transmitted to the video input of the television.

9 Claims, 37 Drawing Figures

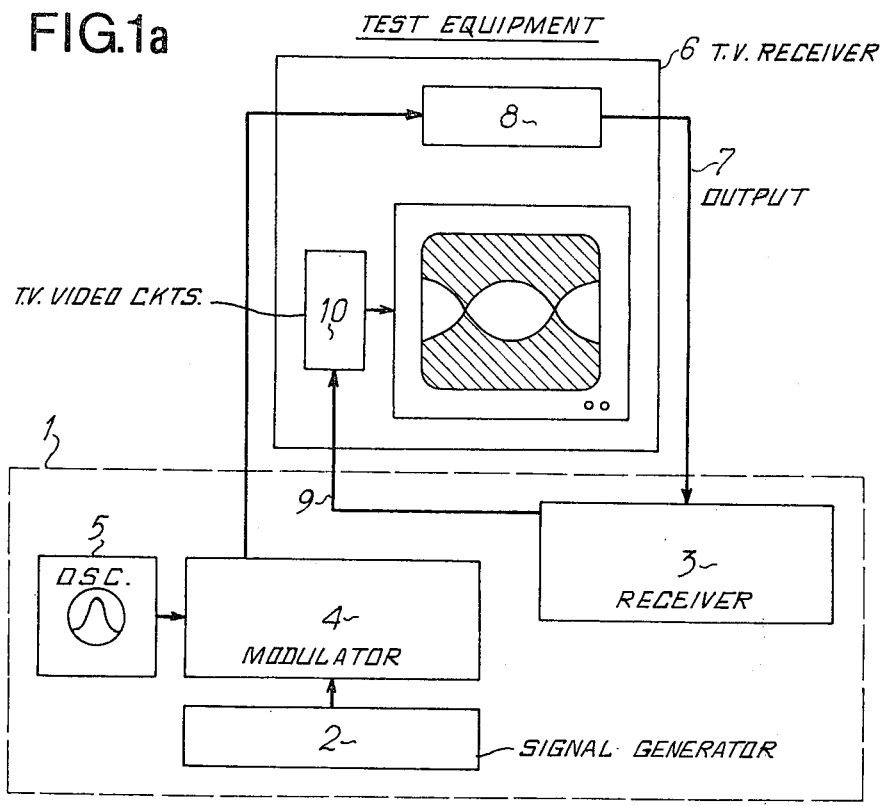
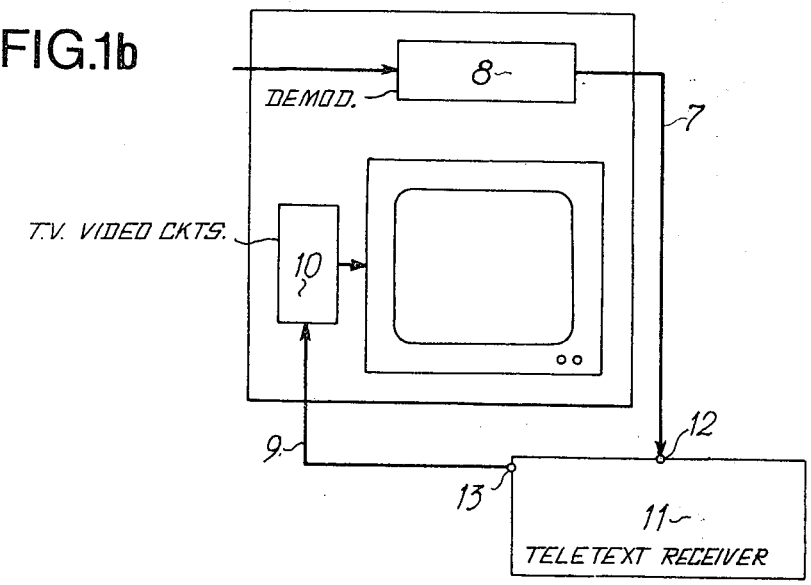

TEST SIGNAL RECEIVER 3

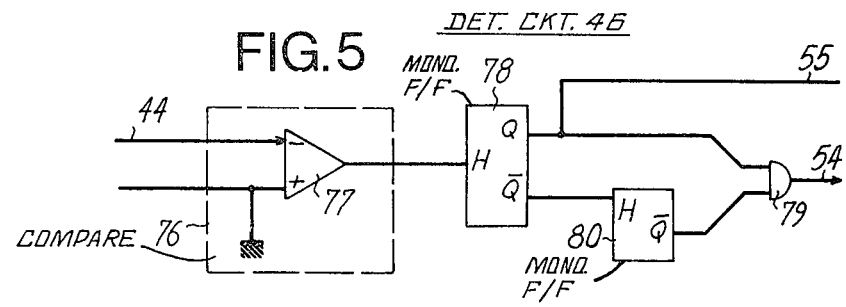
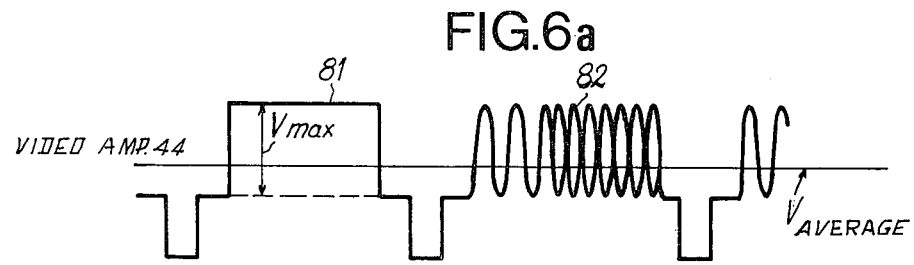
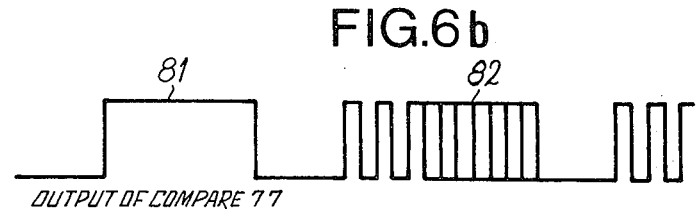
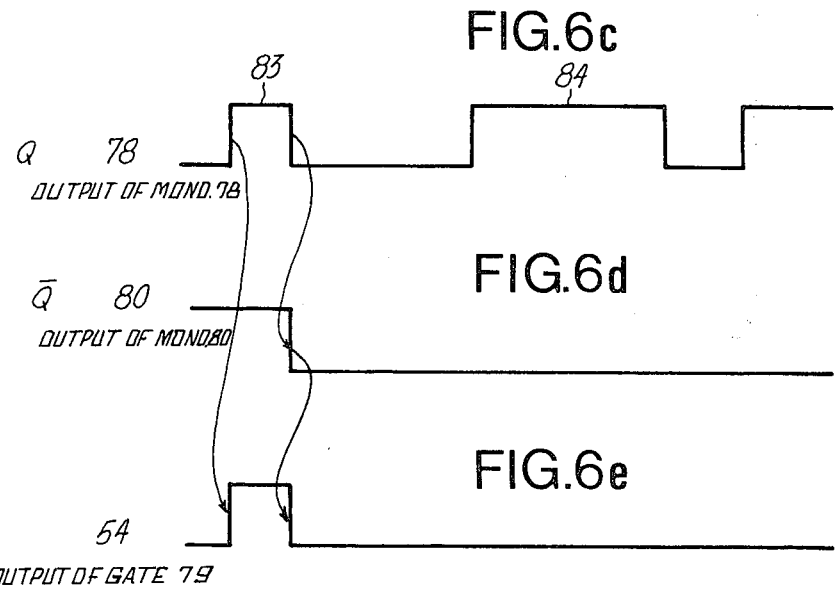

OPERATION OF TEST EQUIPMENT "EYE DIAGRAM" SHOWING IDEAL RECEPTION

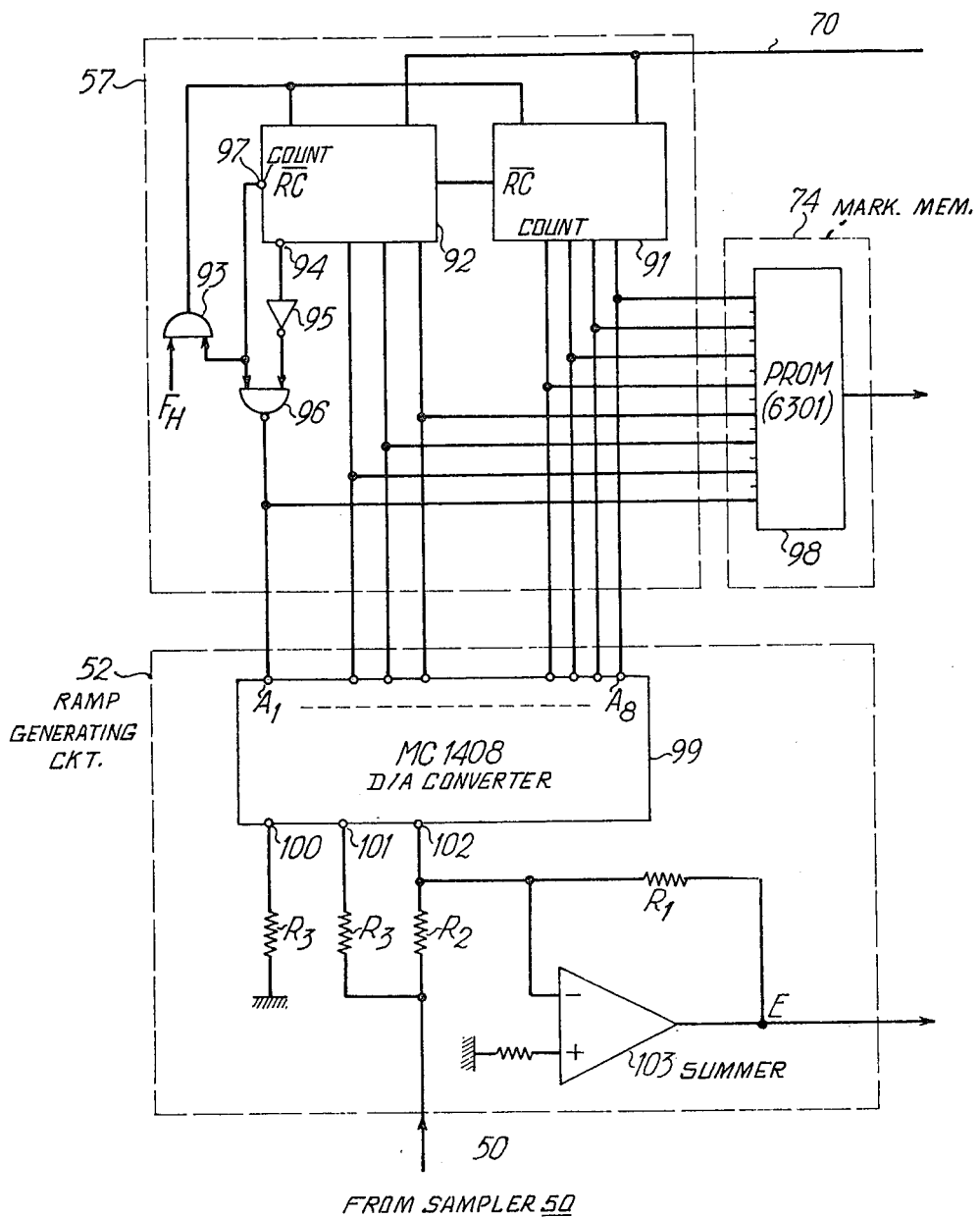

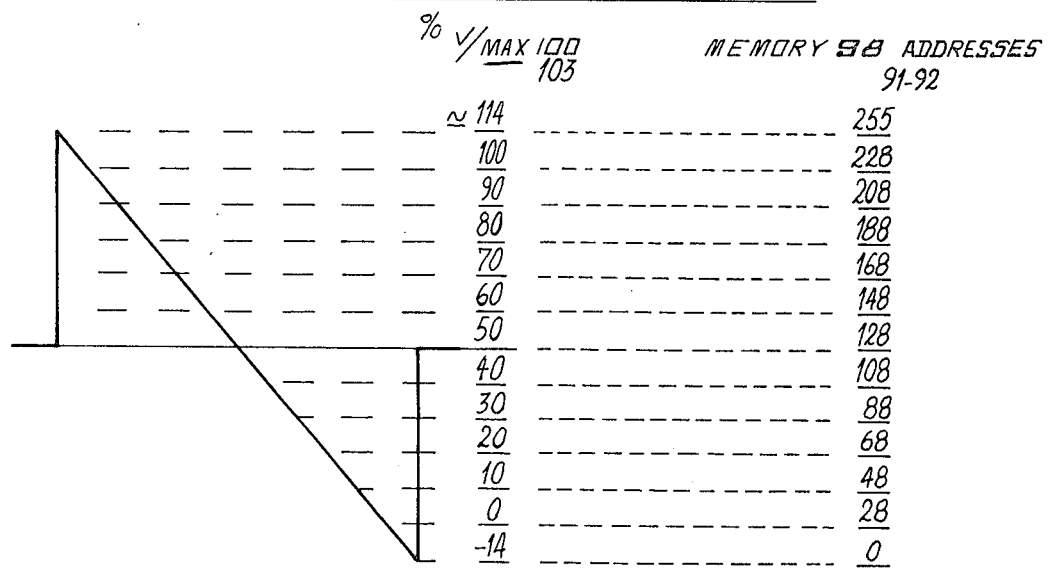
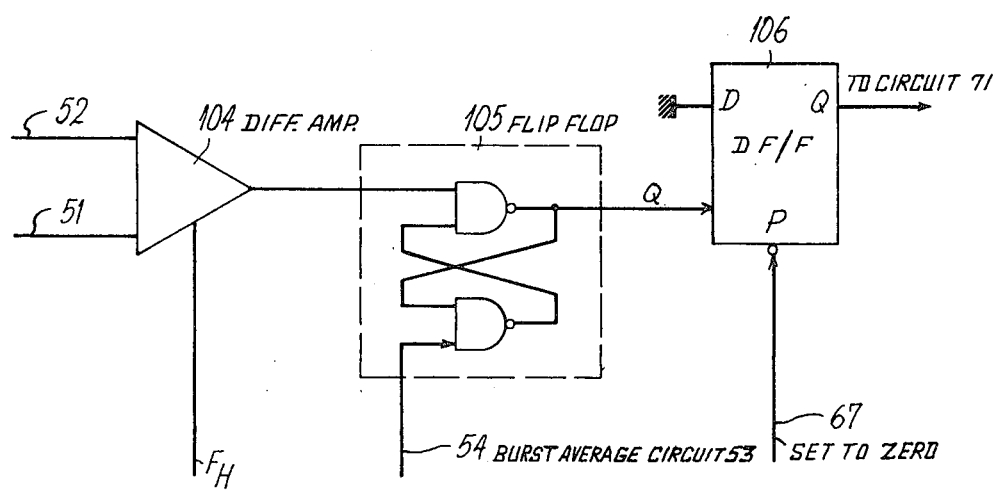

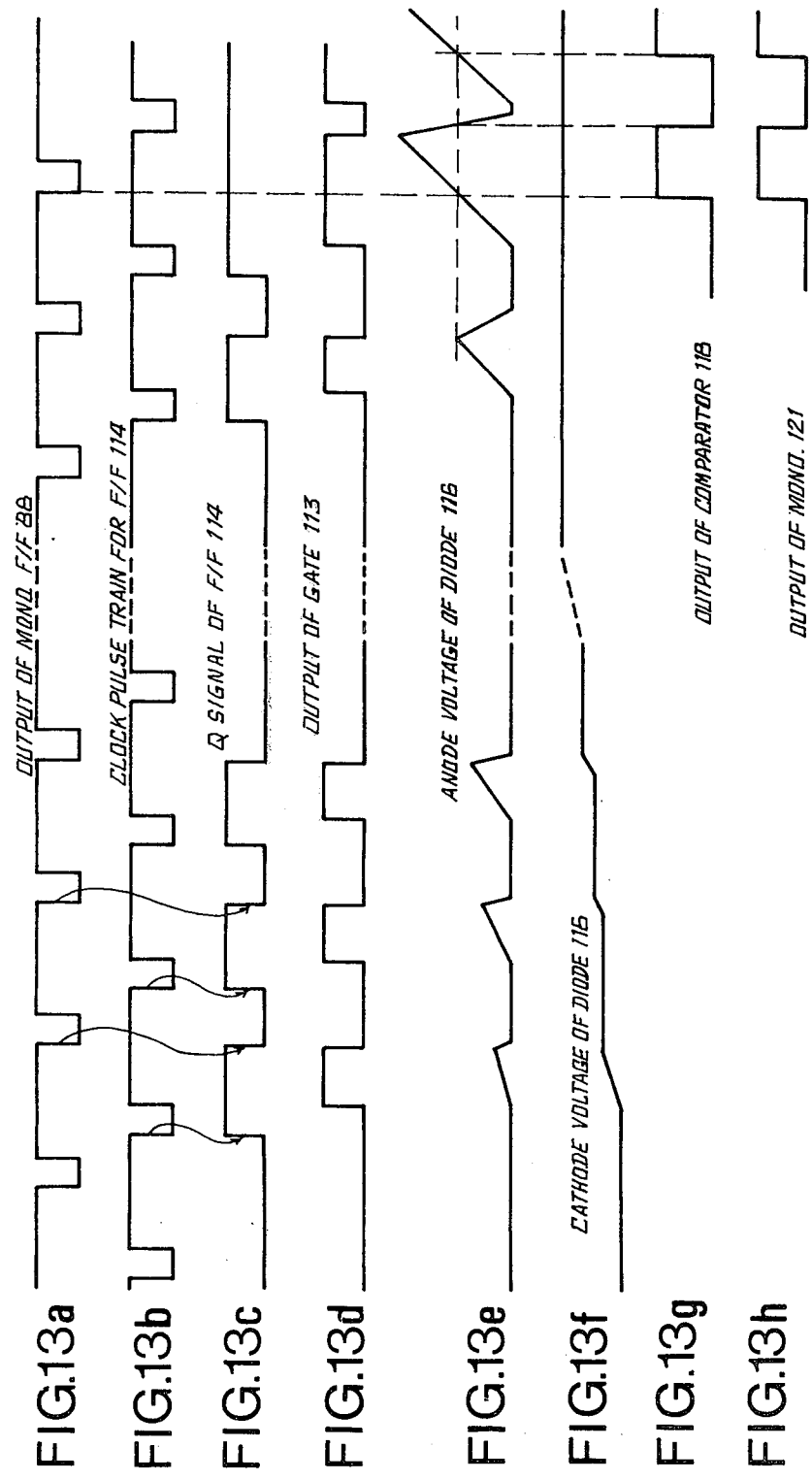

FIG.14
RESYNCHRONIZATION CIRCUIT 70
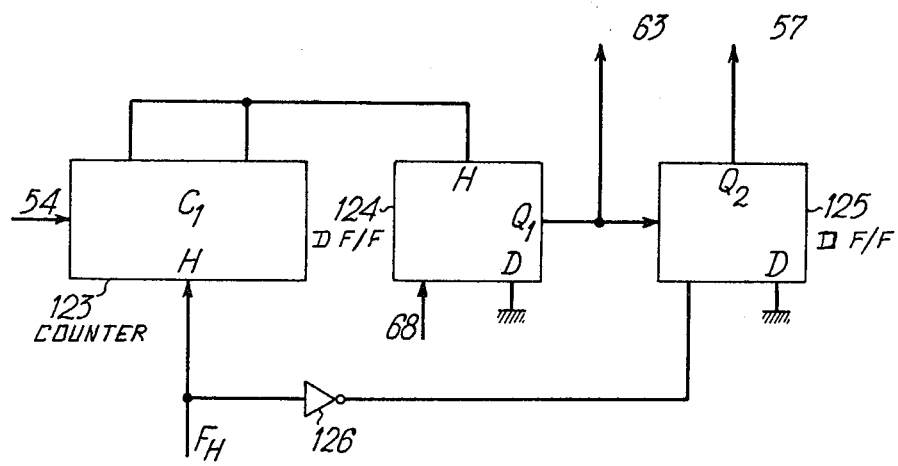
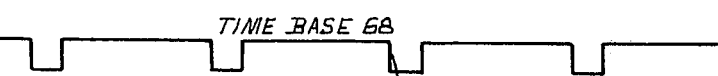
FIG.15a — TIME BASE 68
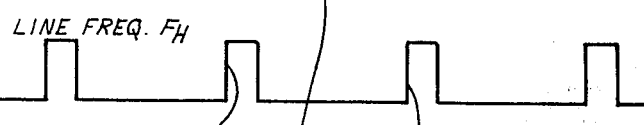
FIG.15b — LINE FREQ. $F_H$
FIG.15c — OUTPUT COUNT. 123
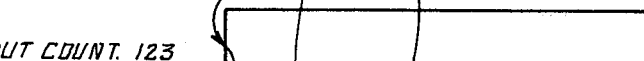
FIG.15d
FIG.15e

TEST EQUIPMENT FOR A TELETEX TELEVISION RECEIVER

The present invention is related to test equipment for the demodulation of a teletex television receiver. More particularly, the invention is related to test equipment in which a visual or eye diagram is displayed on the television receiver screen allowing an assessment of the quality of the receiver's demodulator.

Teletex systems, which provide for the display on the screen of a television receiver of pages of test or graphical data, are now well known. Thus, for the sake of example, one can note, in France, the system known by the trademark "ANTIOPE", or, in the United Kingdom the system known by the trademark "CEEFAX". In these systems, the information to be displayed appears in the form of digital data packets, which are inserted in the active part of the television lines. In France the television broadcasting system, known by the trademark "DIDON" carries out the insertion and the transmission of these digital data packets.

The first experiments, in real size, of the transmission of teletex have shown that the different links of the broadcasting chain, that is, the television signal transmitters, the wave propagation path and the television receivers of the public network, if well adapted to transmit sound and picture, could present certain deficiencies with regards to the transmission of digital data. Remedies can be relatively easily be brought to the transmitters which are of relatively small number and are maintained by highly qualified personnel. On the other hand, the television viewers own television receivers which may differ in age, technology, etc. Thus, a teletex service must be able to be available to all, in particular if it is a public service, and, in other respects, through the above-mentioned experiments, it has been observed that the demodulators of the television receivers constitute the weakest link in the transmission chain.

Consequently, one object of the present invention comprises providing testing equipment to test the demodulator of a television receiver.

To estimate the performance of the demodulator with respect to noise and timing errors in the sampling instant, we use, as is done in conventional data transmission systems, a diagram showing over a time interval centered around the sampling instant, all the values that the signal is likely to take. The central part of this diagram has a shape similar to that of an eye and thus the name "eye diagram". Usually we show the eye diagram on an oscilloscope. However, the cathode ray tube of a television receiver can equally well be used, for example, as mentioned in the technical report by M. G. Croll entitled "CEEFAX: Technical Measurements", published in the Journal BBC Record, No. 6, 1977, pages 4 to 7, or the conference of J. P. Chambers entitled "Measurement and Specification of Teletex Waveforms", published in the IBC 76 Journal, pages 117 to 121.

Another object of the invention comprises providing test equipment, in order to test the demodulator of a television receiver and to generate the eye-diagram on the picture tube of the same television receiver.

In accordance with a feature of the invention, there is provided test equipment for the demodulator of a teletext television receiver comprised of a digital test signal generator delivering pseudo-random digital data packets with a fundamental frequency of binary elements to an HF modulator whose output is connected to the HF input of the television, and a receiver having a data regeneration circuit with a controllable variable threshold, the input of said receiver being connected to the video output of the said demodulator, in which the said generator transmits pseudo-random data packets with two double-intervaled binary elements at two predetermined instants $t_1$ and $t_2$ of each packet and in which said data regeneration circuit is comprised of means to vary its threshold line by line from a maximum value to a minimum value, said receiver comprising a sampling clock with a second frequency lower than the first in the ratio $(n-2)/n$, where n is equal to the integer ratio of the first frequency to the line frequency of the teletext television receiver, means for insuring resynchronization of the sampling clock at the middle of each line and a pseudo-random data reception circuit, the output of which generates a digital signal for each error detected is connected to the video input of the television.

According to another feature, the generator is comprised of means to create a data reference line where all the binary elements are 1's and the receiver is comprised of means to detect said reference line and first means to evaluate the maximum value of the reference line level, said maximum value being used in a ramp generator whose output determines the threshold of the said data regeneration circuit.

Figure 3:
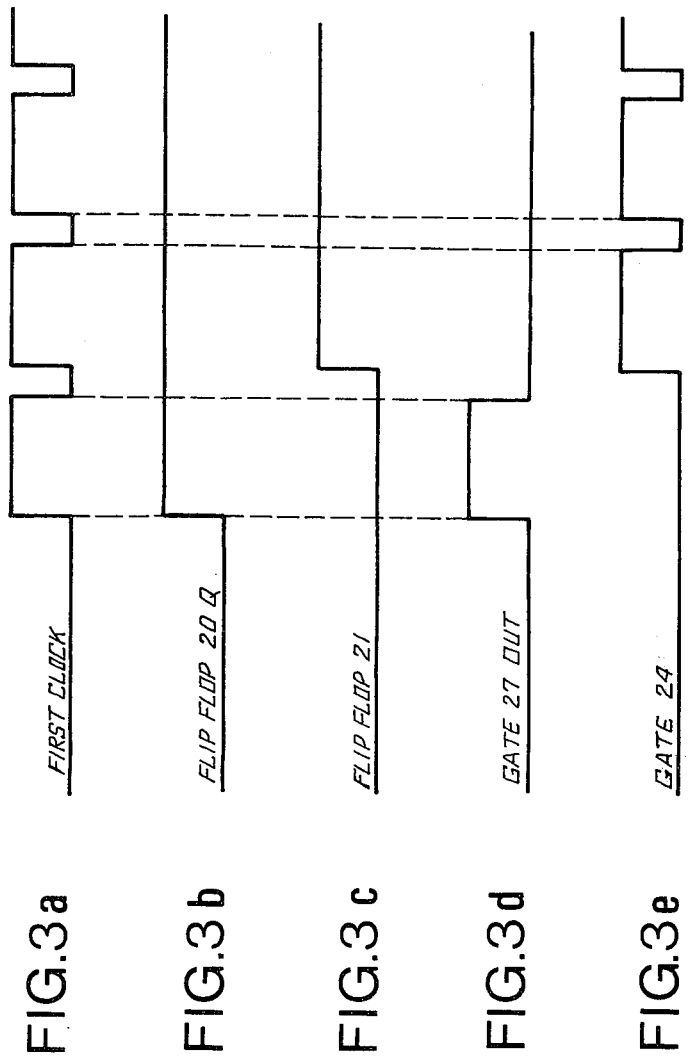
Figure 4:
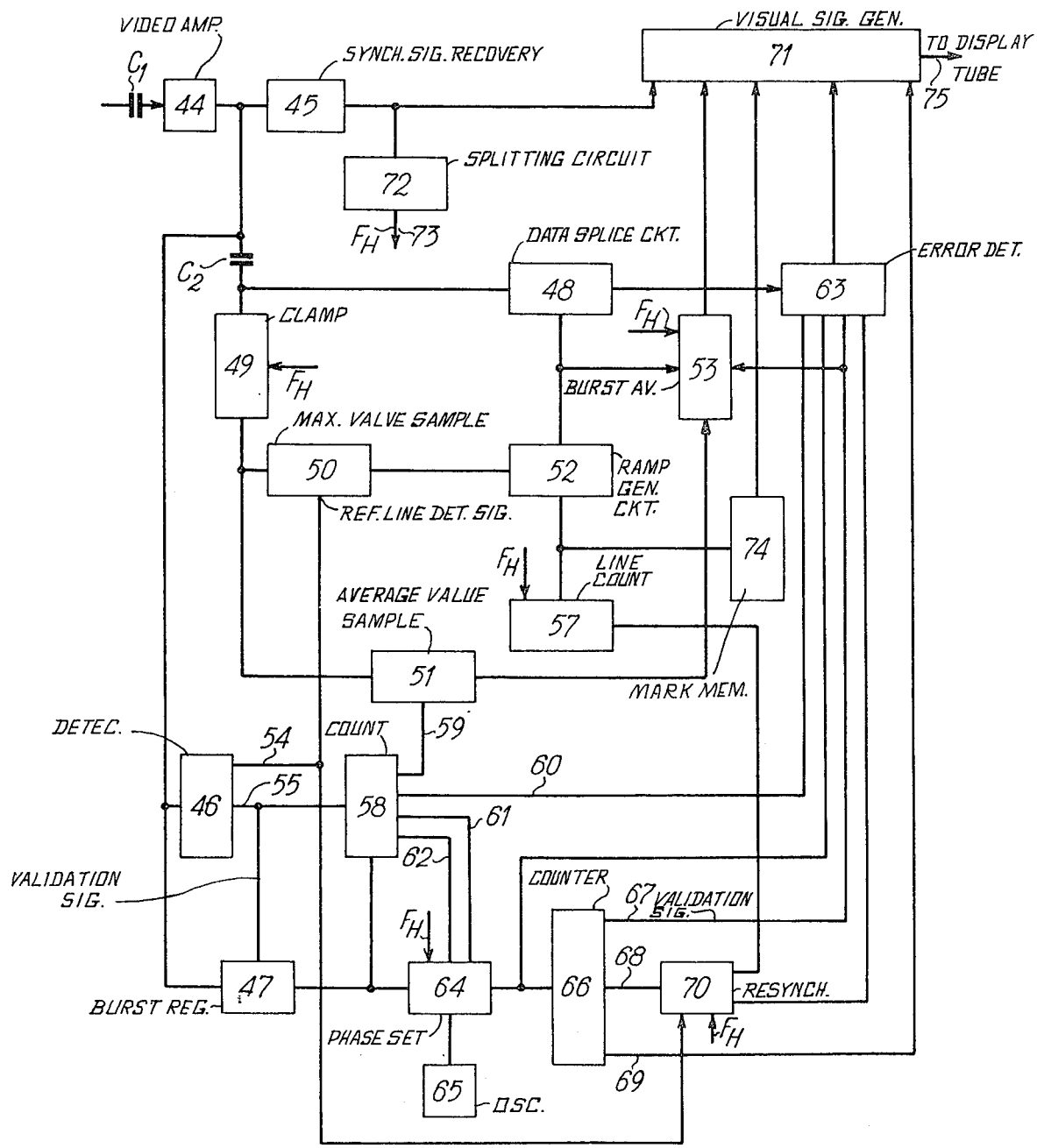
Figure 7:
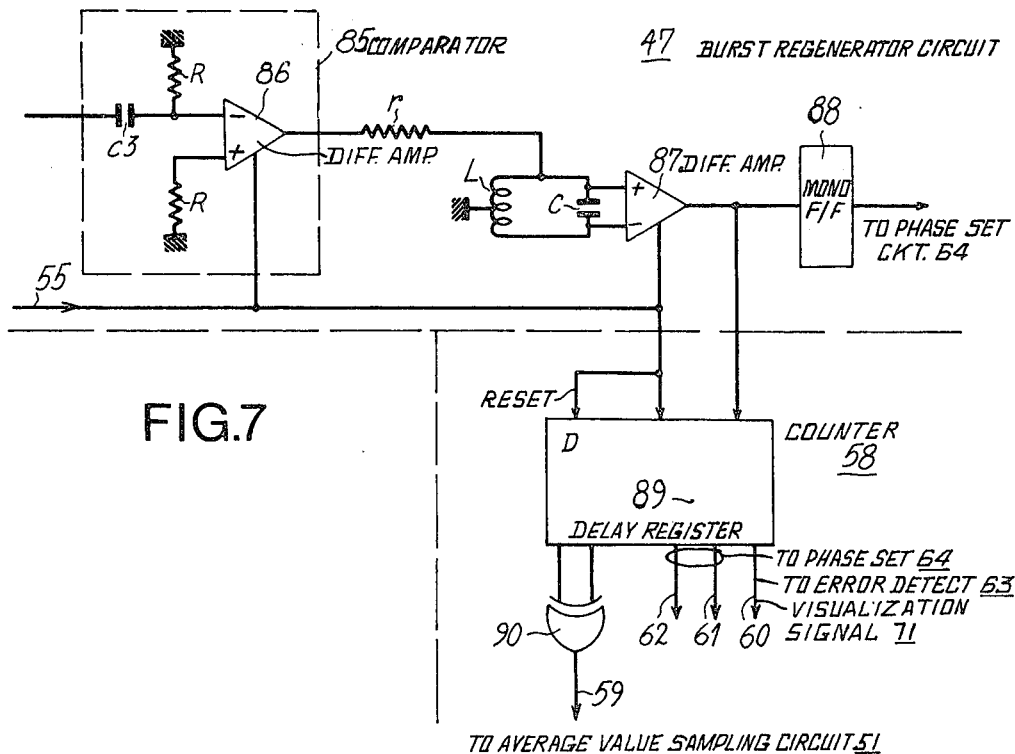
Figure 16:
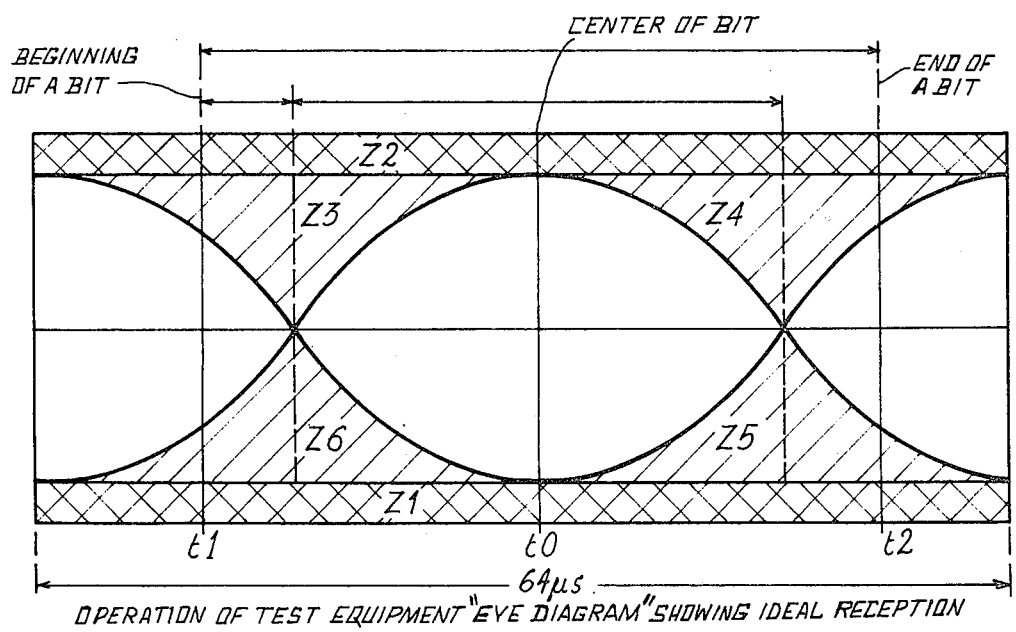
Figure 11:
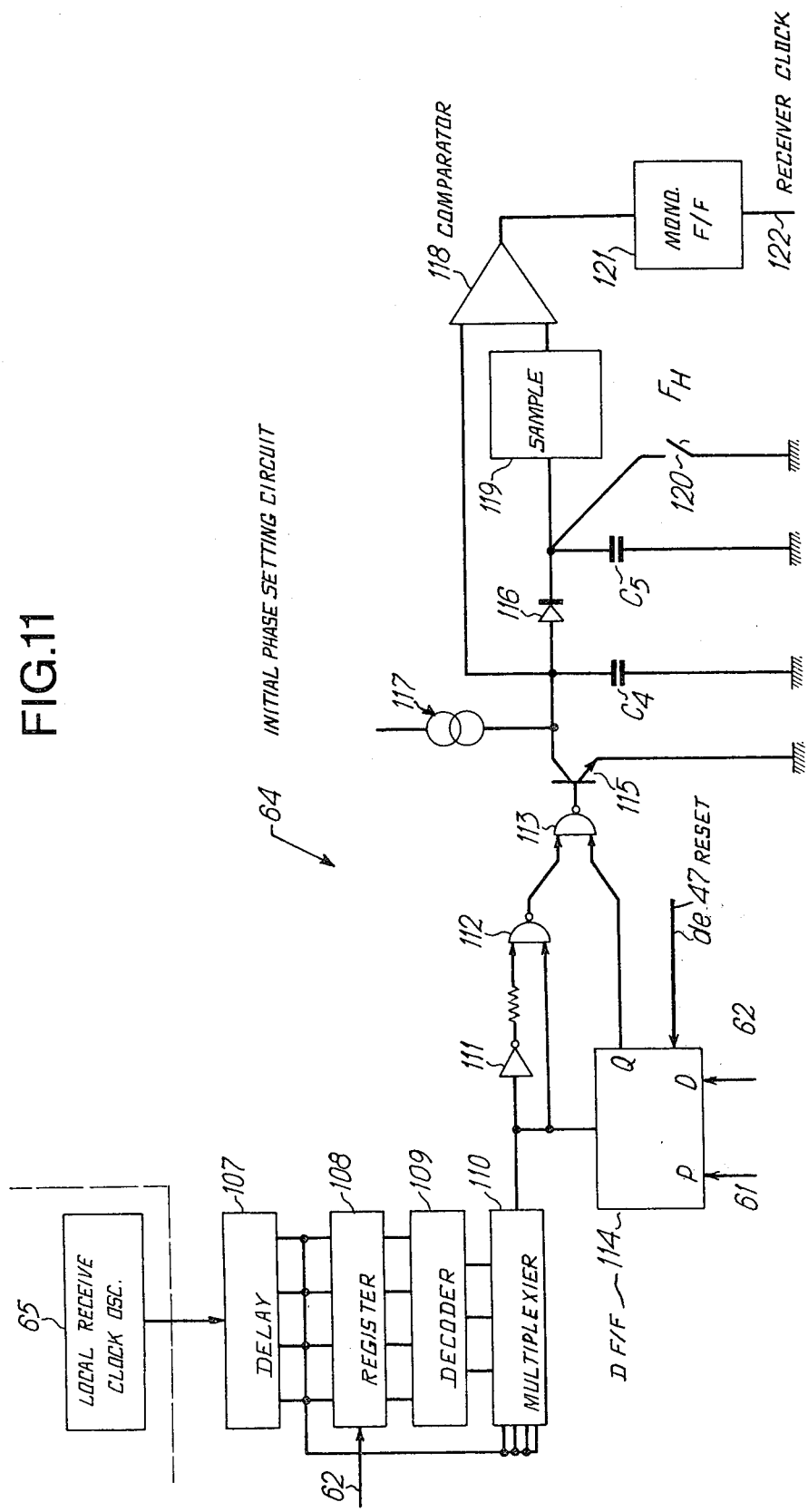

The features of the above mentioned invention, as well as others will become clearer upon reading the description of an embodiment, said description which was made with reference to the accompanying drawings, in which:

FIG. 1a is a block diagram of the test equipment, according to the invention, associated with a television receiver to be tested, FIG. 1b is the block diagram of a teletext receiver associated to a television, FIG. 2 is the block diagram of the signal generator used in the equipment of FIG. 1, FIGS. 3a, 3b, 3c, 3d, and 3e are waveforms illustrating the operation of a circuit of the generator represented in FIG. 2, FIG. 4 is the block diagram of the signal processing receiver used in the equipment of FIG. 1, FIG. 5 is a schematic of the reference line detector for the receiver of FIG. 4, FIGS. 6a, 6b, 6c, 6d and 6e are waveforms illustrating the operation of the circuit of FIG. 5, FIG. 7 is the schematic diagram of the burst regeneration circuit for the receiver of FIG. 4, FIG. 8 is the schematic of the line counter and of the ramp generator for the receiver of FIG. 4, FIG. 9 is a diagram illustrating the ramp voltage delivered by the ramp generator of FIG. 8, FIG. 10 is a schematic of the circuit identifying the average voltage of the receiver in FIG. 4, FIG. 11 is the schematic of the initial phase setting circuit for the receiver in FIG. 4, FIGS. 12a and 12b are waveforms illustrating the operation of the receiver of FIG. 4, FIGS. 13a, 13b, 13c, 13d, 13e, 13f, 13g and 13h are waveforms illustrating the operation of the circuit in FIG. 11, FIG. 14 is the schematic of the resynchronization circuit for the receiver of FIG. 4, FIGS. 15a, 15b and 15c are waveforms illustrating the operation of the circuit of FIG. 14, and FIG. 16 represents an eye diagram as displayed in the case of ideal signal reception.

The test equipment 1 of FIG. 1a consists of a test signal generator 2, a test signal processing receiver 3, a modulator 4 and an oscillator 5. A video output of generator 2 is connected to the modulation input of modulator 4 whose carrier input is connected to the output of oscillator 5. The high frequency output of modulator 4 is connected to the HF input of the television receiver 6 to be tested. The video output 7 of the demodulator 8 of receiver 6 is connected to the input of the receiver 3. The output of the processing receiver 3 is connected to the video input 9 of the video circuits 10 of the television receiver 6.

In FIG. 1b, there is also shown a teletext data receiver 11 whose input 12 can be connected to the video output 7 of demodulator 8 and whose output 13 can be connected to the video input 9 of the video circuits 10.

In FIG. 2 the test signal generator 2 is comprised of a quartz oscillator 14 whose h output delivers what is called the clock signal, which is distributed to the other circuits of the generator 2. A programmable divider 15 has its output connected to a first input of a phase comparator 16 whose output is connected to the control input of a voltage controlled oscillator 17 whose output is connected to the input of a television synchronization generator 18. The synchronization generator 18 has a first output connected, on one hand, to the second input of the phase comparator 16, and on the other hand, has one signal input from a circuit 19, one output connected, on one hand, to a control input of circuit 19, and on the other hand, to the CLR input of a circuit made up of two flip-flops 20 and 21 in series, and a third output connected to the input of a level setting circuit 22 whose output is connected to the input of a shaping circuit 23. The output of circuit 19 is connected, on one hand to the input of an AND gate 24 whose output is connected to the input of a time base circuit 25 and, on the other hand, to the clock inputs of the flip-flops 20 and 21. The output of circuit 23 is connected to a first input of a summing amplifier 26. At the D input of flip-flop 20, we assume that a "1" is applied. The Q2 output of flip-flop 21 is connected to the second input of AND gate 24. The output of circuit 19, the output Q1 of 20, and the output Q2 of 21 are respectively connected to the inputs of a three-input NAND gate 27 whose output is connected to one input of an OR gate 25. A first output of the time base circuit 28 is connected to the input of a pseudo-random data generator 29 and a second output of 25 is connected to an initilizing input of a circuit 30. The output of generator 29 is connected to an input of an OR gate 31 whose output is connected to the data input of circuit 30, to which the clock signal is also applied. The output of circuit 30 is connected to the second input of the OR gate 28 whose output is connected to a data level control circuit 32 whose output is connected to the input of a shaping circuit 33 whose output is connected to the second input of amplifier 26. The output of amplifier 26 is the output of test signal generator 2.

The quartz oscillator 14 produces the clock signal h at frequency $F_{eb}$, that is at the bit rate frequency. The divider 15 is a programmable digital divider that can divide the frequency of the signal received from oscillator 14 by the whole number n. The output signal of 15 defines the frequency of oscillator 17, which will be the line frequency of the television signal created by the test signal generator 2. The structure of the frequency locking loop of oscillator 17 is comprised of the phase comparator 16, the oscillator 17, the generator 18 and the link from generator 18 to phase comparator 16 is conventional and its operation is well known. The synchronization generator 18 receives from VCO 17 the signal at the line frequency and extracts, as in a television transmitter, on its first and second outputs 18.1 and 18.2 logic signals for line and frame sychronization and on its third output 18.3 a complete mixed synchronization signal conforming to the broadcasting network standard for test data.

The second output 18.2 of generator 18 is also connected to an input of circuit 19 which also receives the clock signal of oscillator 14. The circuit 19 has a first counter 34 whose counting input is connected to the first output of 18 and the initializing input to the second output of 18. The output of counter 34 is connected to one input of an AND gate 35 whose second input is connected to the first input 18.1 of synchronizing generator 18. The output of AND gate 35 is connected to the validating input of a second counter 36 having a clock input and whose output 37 is that of circuit 19. The counter 34 which receives the line and frame sychronization signals from synchronizing generator 18 has its output activated only for visible lines. The counter 36 has its output activated uniquely during the useful duration of a line, that is, it is not activated during approximately 10.5 microseconds at the beginning of the line, as well as after 63.5 microseconds which can easily be obtained by counting. The output 37 thus produces the bits "1", for each visible line, between the time of the beginning of a packet and the end of a packet of maximum duration. This results in circuit 19 delivering "1's" for each visible line for the duration of the line reserved for the transmission of packets.

The flip-flop 20 is reset to zero each time a synchronization frame is received. When the first clock signal, which corresponds to the insertion of the first line, comes from circuit 19, as shown in FIG. 3a, and is applied to flip-flop 20, its Q output goes to 1, FIG. 3b, the state of flip-flop 21 remaining unchanged. The output of gate 27 thus yields a signal corresponding to that shown in FIG. 3d. Upon reception of the signal coming from 19, the flip-flop 21 changes states, as shown in FIG. 3c. Gate 27 is thus inhibited for all following lines. However gate 24, which was inhibited during the first line is open for the following lines, as shown in FIG. 3e.

The time base circuit 25 has a counter 38 receiving the clock pulses h and from circuit 24 a validation for each visible line except the first. For clarity of presentation, we have shown the counter 38 in the shape of a register having as many output points as there are information carrying bits in one line. The first output point is connected to the 1 setting input of a flip-flop 39 while the last output point is connected to the 0 setting input of this flip-flop. The 1 output of flip-flop 39 is connected, on one hand, to one input of an AND gate 40 having three inputs and, on the other hand, to the second input of OR gate 31. In other respects, two particular output points a and b, for which we shall see how they are determined below, are respectively connected to the inputs of an OR gate 41 whose output is connected, by means of an inverter 42, to the second input of AND gate 40. The third input of AND gate 40 receives the clock signal h. The output of AND gate 40 is connected to the input of the pseudo-random data generator 29. The generator 29 thus delivers, for each clock signal passing by AND gate 40, one bit that is part of a random sequence. For the basic instants corresponding to the output points a and b of counter 38 connected to OR gate 41, it delivers the same signal as it did at the previous instant. Before the instant corresponding to the first output point and after the instant corresponding to the last output point, the OR gate 31, having its input connected to the Q output which is then at 0, of flip-flop 39, delivers 0's.

In fact, in the example described, the generator 29 supplies a pseudo-random sequence of length 2047 binary bits obtained by modulo two division of the polynomial "1 followed by an infinity of zeros" by the polynomial $x^{11}+x^2+1$. This sequence does not contain an integral multiple of times during a frame and gives a lively structure. We could freeze this structure by reinitializing the divider at the beginning of each frame.

The circuit 30 has a delay register 43 having a capacity of two octets and having parallel loading inputs alternatively connected to a source of voltage and to ground, which allows the introduction to loading of two octets each having the following composition: 10101010. The initial loading input of register 43 is connected to the first output point of counter 38. The register 43 which receives the clock signal at its delay input is emptied towards OR gate 28. At each output of a bit from delay register 43, a new bit is written and provided from the output of gate 31, that is, provided from data generator 29 or flip-flop 39.

The level setting circuits 22 and 32 as well as the shaping circuits 23 and 33 are conventional circuits in the technical field of television and data transmission. Amplifier 26 is an impedance adapter.

As a result of the above description, in each frame as far as the visible part of the picture is concerned, the test signal generator 2 delivers a first line whose useful portion consists of "1's" provided from circuit 21, through OR gate 28, and a sequence of lines whose useful portion consists of two synchronization octets of bits, and a sequence of pseudo-random bits.

As has been mentioned above, the output signal of test signal generator 2 serves as modulating signal in modulator 4 (FIG. 1a) which provides a modulated signal to the HF input of the television receiver 6 to be tested. Finally, the signal is demodulated in the demodulator 8 to be applied at the receiver 3.

The test signal receiver 3, FIG. 4, is comprised of a video amplifier 44 to which the video signal is applied through a capacitor C1 and whose output is respectively connected to the input of a synchronization recovery circuit 45, to one lead of a capacitor C2, to the input of a detector circuit 46 and to the input of a burst regeneration circuit 47. The second lead of the capacitor C2 is connected, on one hand, to the input of a data clipping circuit 48, and, on the other hand, to the input of a clamping circuit 49, whose output is connected, on one hand, to the input of a maximum value sampling circuit 50, and on the other hand, to an average value sampling circuit 51. The output of the sampling circuit 50 is connected to the input of a ramp generating circuit 52 whose output is connected, on one hand, to the control input of the splicing circuit 48, and on the other hand, to the control input of the burst average value marking circuit 53. The output of circuit 51 is connected to the signal input of circuit 53.

The detector circuit 46 has two outputs 54 and 55. The output 54 provides a reference line detection signal and is connected, on one hand, to the control input of circuit 50, and on the other hand, to an initialization input of line counter 57. The output 55 of detector 46 provides a signal for each useful line, other than the first, and is connected to the initializing input of a counting circuit 58. The output 55 also provides a validation signal and is connected to the control input of the regeneration circuit 47.

The counting circuit 58 has four outputs 59 to 62. The output 59 provides a signal to control the sampling circuit 51. The output 60 provides a triggering signal which is connected to a control input of an error detection circuit 63. The outputs 61 and 62 provide control signals at different instants and are respectively connected to the corresponding control inputs of a phase setting circuit 64.

The signal input of the phase setting circuit 64 is connected to the output of a stable oscillator, for example a quartz oscillator 65. In other respects, circuit 64 still has one control input connected to the output of the burst regeneration circuit 46 and one control input to which is applied a signal at line frequency $F_H$. The output of phasing circuit 64 is connected, on one hand, to a clocking input of circuit 63 and, on the other hand, to the input of a bit counter 66. The output of circuit 47 is also connected to the control input of counting circuit 58.

The bit counter 66 has three outputs 67 to 69. The output 67 provides a validation signal which is connected to a control input of circuit 63 and to an initialization input of circuit 53. The output 68 provides a signal indicating the middle of the lines and is connected to a circuit generating resynchronization signals 70. The output 69 is connected to one signal input of a circuit creating the visualizing signal 71.

The output of the synhcronization recovery circuit 45 is connected on one hand, to a signal input of circuit 71, and on the other hand, to the input of a splitting circuit 72, for providing at its output 73 a signal at the line frequency $F_H$.

The output of the data splicing circuit 48 is connected to the data input of the error detection circuit 63. The output of line counter 57, which in reality is comprised of a bundle of wires is connected, on one hand, to the corresponding input of the ramp generating circuit 52 and, on the other hand, to the corresponding inputs of a marking memory 74 whose output is connected to a signal input of circuit 71.

The video amplifier 44 constitutes the input stage providing video at a very low impedance. The capacitor C1 at the input of 44 prevents the transmission of a d.c. component. The circuit 45 extracts from the video signal the complete synchronization which is reinjected into the mixer circuit 71, which can thus provide, by 75, a complete video signal for the display tube. In other respects, the circuit 72, allows the acquisition, from the complete synchronization, of the signal at line frequency $F_H$ used in the clamping circuit 49, the phasing circuit 64, the resynchronization circuit 70 and the line counter 57.

The circuit 46 is used to detect the first line made up of "1's" as well as the beginning of packets. One embodiment of circuit 46 is shown in FIG. 5. It is comprised of a comparator 76, including an amplifier 77 whose —input is connected to the output of 44 and +input is connected to ground. The output of 77 is connected to the input of a monostable circuit 78 whose Q output is connected, on one hand, to the output 55, and on the other hand, to one input of an AND gate 79 whose output is connected to the output 54. The Q output of 78 is connected to the input of a monostable circuit 80 whose Q output is connected to the second input of gate 79.

The signal of FIG. 6a represents the signal provided from 44 at the arrival instant of reference line 81 followed by useful lines 82. This signal does not have any d.c. component. The line 80 is entirely made up of "1's" from which the amplitude is constant. The average value of the signal of FIG. 6a is indicated by $V_{average}$. The +input of 77 being at ground potential, the output of 77 provides the signal of FIG. 6b, that is those parts of the applied signal above the average value. The time constant of the monostable 78 is chosen to be equal to a few microseconds (less than 10 microseconds) and, furthermore, the monostable 78 is assumed to be retriggerable. As a result, the first transition of line 81 creates a window 83 whose width is equal to the time constant of monostable circuit 78, but for the next lines, the monostable remains operational for the duration of the line and more, as shown by window 84. The falling edge of window pulse 83 triggers the monostable 80 whose time constant is slightly less than the duration of a frame, as shown by curve 6d. The output signal of gate 79 thus appears as shown in FIG. 6e.

FIG. 7 illustrates an embodiment of circuits 47 and 58. The circuit 47 has a comparator formed of a differential amplifier 86 whose −input is connected to the output of 44 by a capacitor C3. For direct current, the +input and −input are grounded through a resistance R. The output of amplifier 86 is connected, by a link resistance r, to an LC circuit, the midpoint of the inductor L being ground and the terminals of the capacitor C being respectively connected to the − and + inputs of a differential amplifier 87. The LC circuit is tuned to 3.1 MHz to eliminate the noise components, namely the parasitic modulation from the windows. The validation inputs of the differential amplifiers are connected to the output 55 of detector 46 (FIG. 4). Thus the signal filtered by the LC circuit is reclipped in amplifier 87 whose output is connected on one hand, through a monostable circuit 88 operating on the transitions, to a signal input of a phasing circuit 64, and on the other hand, in circuit 58, to the clocking input of a delay register 89. The delay register 89 has eight stages. Two outputs of register 89 are respectively connected to the inputs of an exlusive OR gate 90 whose output is connected to the control input of the sampling circuit 51 (FIG. 4). In practice, the output 59 of OR gate 90 defines a time window in which circuit 51 determines the average value of its applied signal during the same time. Another output 60 of register 89 determines, at the end of the burst, the beginning of data analysis, and as such, is connected to circuit 63 (FIG. 4). Two other outputs 61 and 62 of 89 are connected to the phasing circuit 64 (FIG. 4). In other respects, the CLR and D inputs of 89 are connected to the output 55.

The clamping circuit 49 (FIG. 4) is a conventional circuit allowing the definition of a 0 volt level for black for the line signals applied to circuits 50 and 51.

The sampling circuit 50 is made up of, for example, a blocking sampler which integrates in one capacitor the peak voltage of signal 81 of FIG. 6a for the duration of window 83 which is applied from output 54 of counter 58. This circuit 50 provides a permanent voltage equal to that stored in the capacitor, namely the maximum voltage $V_{max}$ of curve 81. Circuit 51 has a low pass filter followed by a blocking sampler which is operated during the time window defined by the output 59 of OR gate 90, FIG. 7.

The line counter 57, FIG. 8, consists of two four stage binary counters 91 and 92 set up in cascade. The initializing inputs of the counters are connected to one output of 70 and are loaded to their maximum at the beginning of each frame, that is for the set of counters to 255. Circuit 57 also has an AND gate 93 for which one input receives the line frequency $F_H$ and whose output is applied to the countdown inputs of counters 91 and 92. The most weighted output 94 of counter 92 is connected to the input of an inverter 95 whose output is connected to one input of a NAND gate 96 whose second input, like the second input of AND gate 93, is connected to the carry output 97 of counter 92. The counting outputs of counter 91 and those of counter 92, except the most weighted output 94, are connected in parallel, as well also the output of NAND gate 96, on one hand to the corresponding inputs of a PROM memory 98 of circuit 74 and on the other hand to the corresponding inputs of digital data of a digital to analog converter 99 for the ramp generator 52 (FIG. 4).

As long as the content of counters 91 and 92 is greater than or equal to 128, the outputs 94 and 97 are each at "1", thus given the inverter 95, we have a "1" and a "0" at the inputs of NAND gate 96 which provides a "1". When the content of the counters is less than or equal to 127, the output 94 is at "0", thus the two inputs of gate 96 are at "1" and 96 provides a "0". Thus as far as the memory 98 and the converter 99 are concerned, during the countdown, everything takes place as if their most weighted inputs were directly connected to 94. When the content of the counters is zero, at the end of the countdown, the carry output 97 goes to "0", thus the inputs of gate 96 are now "0" and "1" and gate 96 provides a "1", which amounts to applying a value of 128 to the inputs of PROM 98 and converter 99, until the next loading of the counters at the next frame.

The digital to analog converter 99 is a converter for example of the type MC1408 sold commercially by MOTOROLA and has one terminal 100 connected to ground by a resistor of value R3, one terminal 101 is connected to the output of circuit 50 (FIG. 4), providing a maximum voltage $V_{max}$ by means of a resistor R3, and a terminal 102 connected on one hand, to the output of sampler 50 by a resistor of value R2 and, on the other hand, to the −input of an operational amplifier 103, set up as a summer. The +input of 103 is connected to ground by an appropriate resistor and its input is connected to its −input by a resistor of value R1. The terminal 102 provides a current equal to $-(a \times V_{max}/R3)$, in which the coefficient a is given by the following formula:

$$a = A^1/2 + A^2/4 + A^3/8 + - A^8/256$$

where $A^1$ to $A^8$ specify the binary values applied to the inputs of the same name of converter 99. Thus a varies by 1/256th from 0 to 255/256, thus practically from 0 to 1.

The voltage E at the output of amplifier 103 is given by the following formula:

$$E = (R1/R3)aV_{max} - (R1/R2)V_{max}$$

In one embodiment, we have chosen resistance values for R1 to R3 such as R1=1792 ohms, R2=12800 ohms and R3=1400 ohms, which leads to a linear variation of E as a function of a, as shown in FIG. 9. At the beginning of counting, that is at the visible part of the frame, we have:

$$a \simeq 1 \text{ from which } E = (114/100)V_{max}$$

and at the end of counting, that is at the end of the visible part of the frame, we have:

$$a = 0 \text{ from which } E = -(14/100)V_{max}$$

It is thus apparent that the ramp provided by circuit 52 varies linearly from 1.14 $V_{max}$ to $-0.14 V_{max}$. As we shall see below, such a ramp has to be chosen to ensure, at the beginning of error analysis, a decision threshold level above the maximum level of the video signals and, at the end of the analysis, a negative decision threshold.

At the right of FIG. 9, we have shown, in the first column, the values (within $V_{max}/100$) of E, varying between 0 and 100 in 10 by 10. In the second column, we have indicated the memory 98 address values for which it provides a marking signal to the circuit 71 (FIG. 4). It is thus clear that during the countdown of counters 91 and 92, each time the output count reaches a value of the second column mentioned above, the corresponding line is thus marked on the television screen. It will be observed that the values chosen correspond to a marking every 10% between the values of 0 and 100 of the first column.

FIG. 10 shows the schematic of the marking circuit for the average voltage $V_{average}$. The circuit 53 has a differential amplifier 104 for which one signal input is connected to the output of ramp generator 52 (FIG. 4), the other signal input is connected to the output of circuit 51 providing the average value $V_{average}$, and for which the validation input is connected to the output $F_H$. The output of amplifier 104 is connected to the input of an RS flip-flop 105 whose second input is connected to the output $F_V$. The Q output of flip-flop 105 is connected to the clock input of a D flip-flop 106 whose Q output is connected to circuit 71 (FIG. 4) and whose initializing input P is connected to the output of 67 of counter 66.

FIG. 11 shows the initial phase setting circuit 64 (FIG. 4), as well as the local receiving clock 65. In other respects FIGS. 12a and 12b are received clock and sampling clock timing diagrams respectively. The clock of the received signal is, except for phase, the clock of oscillator 14, FIG. 2, and is at a frequency equal to $nf_H$. The receiving sampling clock has a frequency defined by the frequency of the local oscillator 65, this frequency being chosen equal to $(n-2)f_H$. When in practice at the beginning of each frame correct phase is achieved on two corresponding clock impulses of curves 12a and 12b, an offset follows for the duration of the line which varies linearly between the two clocks. The purpose of circuit 64 is to create a constant phase offset of the signals supplied by oscillator 65 and the burst regenerator circuit 47 (FIG. 4), in such a way as to obtain this initial phase setting. In the receiver, the clock of the received signal is provided by the two octet synchronization burst regeneration circuit 47. In circuit 64, the output of oscillator 65 is connected to a delay line 107 having four outputs respectively delayed by T/8 where T is the period of oscillator 65. These four outputs are respectively connected to the four inputs of register 108. The state of these outputs is stored in memory responsive to a control control signal or wire 62, the burst phase characteristic. The state of the register is decoded by decoder 109 addresses a multiplexer 110 which selects a convenient phase of 107. As such we have prephasing, the signal provided by the multiplexer 110 having a signal whose phase is neighbour to that of the burst, to within T/8.

The output of multiplexer 110 is connected on one hand, to the input of an inverter 111 whose output is connected to the input of a NAND gate 112, whose output is connected to the input of a NAND gate 113, and on the other hand to the second input of NAND gate 112 and, finally, to the clock input of a D flip-flop 114. The Q output of flip-flop 114 is connected to the second input of NAND gate 113, its D input is connected to the output 62 of counter 58 (FIG. 4), its 1 setting P input is connected to the output 61 of counter 58 and its CLR input is connected to the output of burst register 47. The output of gate 113 is connected to the base of a transistor 115 whose emitter is grounded and whose collector is respectively connected to the anode of a diode 116, ground via a capacitor C4, the output of a current generator 117 and to a signal input of a comparator 118. The cathode of diode 116 is connected to ground by a capacitor C5, to the input of a sampler 119 whose output is connected to the second input of comparator 118 and finally, to one contact of a switch 120. The switch 120 is controlled by the line frequency $f_H$.

The output of comparator 118 is connected to the input of a monostable 121 which provides the receiver clock signal 122.

FIG. 13a shows impulses obtained from the burst transitions at the output of monostable F/F 88 (FIG. 7) and which are active at the CLR input of D flip-flop 114 (FIG. 11) starting at the fourth impulse. FIG. 13b shows the impulses obtained on the leading edge of a clock pulse train applied to the clock input of D flip-flop 114. In practice the impulses of FIG. 13b are made up in a conventional method by inverter 111 and gate 112. They are applied to gate 113.

FIG. 13c illustrates the signal waveshape at the Q output of D flip-flop 114. FIG. 13d illustrates the signal waveshape at the output of gate 113. FIG. 13e illustrates the signal waveshape at the anode of diode 116, that is the charging voltage of capacitor C4. FIG. 13f illustrates the signal waveshape on the cathode of 116, that is the charging voltage of capacitor C5.

The time lapse T between the leading edge of the clock, FIG. 13b, and one burst transition, FIG. 13a, is calculated by the D flip-flop 114. The window obtained, FIG. 13d, is converted into a voltage by the charge on capacitor C5 during the corresponding time, which, before the end of the burst, leads to a sawtooth whose peak value $V_T$ is directly related to the width of the window. This is true when the capacitor C4 is charged up to the peak, diode 116 not conducting anymore. This peak value is stored in memory in the blocking samplider 119 and will later be used as a reference value. In fact, at the 16th bit of the burst, the P input of D flip-flop 114 receives a signal from counter 58 (FIG. 4), which forces the Q output of a binary 1, as illustrated in FIG. 13c. Thus the window of FIG. 13d widens and the sawtooth of FIG. 13e exceeds the value $V_T$. At the moment it exceeds that value, the comparator 118 (FIG. 11) provides a leading edge, FIG. 13g, which is strictly in phase with the leading edge of the impulses of FIG. 13a. Afterwards the final windows of FIG. 13c are repeated, thus the last sawtooth wave forms also exceed $V_T$ such that the flipping instants of comparator 118 make up the sampling instants. Finally the monostable circuit 121 receives the leading edges provided by comparator 118 and provides impulses of constant width, FIG. 13h.

Of course with pulse synchronization guaranteed at the end of a burst, we have, in the remainder of the line, a linear progressive offset, as mentioned above, given that the frequency of oscillator 65 (FIG. 4) equal to $(n-2)F_H$ is less than the frequency of the received signal at $nF_H$.

The time base circuit is made up of a counter whose outputs 67 to 69 correspond to predetermined counts.

The resynchronization circuit 70, FIG. 14 has a counter 123 whose charging triggering input is connected to the output 54 (FIG. 4) of detector 46 and whose clock input receives the signal $F_H$. The "max" output of counter 123 is connected to the clock input of a D flip-flop 124 whose D input is grounded and whose P input is connected to time base output 68, output 68 indicating the middle of a line. The Q output of flip-flop 124 is connected, on one hand, to the corresponding input of error detector 63 (FIG. 4) and, on the other hand, to the clock input of a D flip-flop 125 whose D input is ground and P input is to an inverter 126 the input of which receives $F_H$. The Q output of flip-flop 125 is connected to the loading inputs of counters 90 and 92, FIG. 8.

FIG. 15a is a diagram illustrating the middle-of-the-line impulses provided by time base 68. The diagram of FIG. 15b illustrates impulses at line frequency $F_H$. The diagram of FIG. 15c illustrates the change of state of the output of counter 123 when it has reached its maximum. In practice, the counter 123 operates as a delay circuit. In fact, in a television picture, there are 275 visible lines, but since the capacity of counters 91 and 92 is only 255, we can process only 255 lines. The delay provided by counter 123 allows for centering the 255 lines processed among the 275 visible lines. The purpose of flip-flops 124 and 125 is obvious.

The resynchronization of circuit 63, which is a pseudo-random data receiver, can be done only if we introduce 11 correct bits in the multiplier of that circuit. This case has maximum chance of occurrence if the data clipping threshold provided by circuit 52 is equal to the half of $V_{max}$, that is close to $V_{average}$ and if the sampling instant is at the middle of a bit. This is why we force the first condition of the end of a frame at the beginning of the next, as illustrated in FIG. 9, by output 97, FIG. 8. The second condition exists near the middle of a television line at the instant defined by the circuit of FIG. 14.

The diagram of FIG. 16 illustrates the operation of the test equipment. In other respects, from the preceding description it is apparent that the threshold for clipping the digital signal in circuit 48 varies linearly, following the ramp provided by 52 and in synchronism with the frame sweep of the television. This threshold varies between extreme values which border the received digital signal. Furthermore, the data sampling instant provided by 48 varies linearly in synchronism with the line sweep of the television, give that as shown by FIGS. 12a and 12b that the sampling frequency at the receiver is slightly below the bit transmission frequency, the different being two periods per line.

On the diagram of FIG. 16, at time t0, which corresponds to the middle of a line provided by resynchronization circuit 70, the sampling instant is correct while at times t1 and t2, the sampling instants correspond respectively to the beginning and the end of a bit. We should observe that at the instants t1 and t2, the transmission clock takes one advance shot on the receiver clock. However, the number of bits transmitted must remain equal to the number of bits processed in the receiver, which is why, at the instants t1 and t2, the bit transmitted is double-intervaled, which is obtained by gate 41, FIG. 2.

In zone Z1 of FIG. 16, which corresponds to the ramp part, FIG. 9, below 0, all the sampled bits are obviously equal to 1, which carries an error rate of 50%. In zone Z2, symmetrically, all the sampled bits are equal to 0 and the error rate is still 50%. In zone Z3, the bit to be sampled will always be present except for the case of an upgoing transition, and it is only in this case that an error will occur. In this zone, the combinations 0 0, 1 1, 1 0 introduce no error and only the combination 0 1 leads to sampling a 0 instead of a 1. Thus in this zone, the error rate is 25%. The sample holds true for zone 24 to 26.

The embodiments of the invention in which an exclusive property or privilege is claimed are defined as follows:

1. Test equipment for the demodulator of a teletext television receiver said test equipment being connected to the video input of the television receiver and comprising a digital test signal generator means for delivering pseudo-random digital data packets with a first frequency of binary elements, HF modulator means responsive to said data packets, an output of said modulator means being coupled to an HF input of the television receiver, and receiver means having a data regeneration circuit means with a controllable variable threshold, the input of said receiver means being connected to a video output of the said demodulator, characterized in that said test signal generator means transmits pseudo-random data packets with two double-intervaled binary elements at two predetermined instants $t_1$ and $t_2$ of each packet, said data regeneration circuit means including means for varying the threshold line by line from a maximum value to a minimum value, said receiver means also comprising a sampling clock means for providing a second frequency which is lower than the first frequency in a ratio of $(n-2)/n$, where n is equal to the integral ratio of the first frequency to the line frequency of the teletext television receiver, pseudo-random data reception circuit means for responding to said pseudo-random data packets, and means responsive to the middle of each video picture line for ensuring a resynchronization of the sampling clock means and said pseudo-random data reception circuit means, the output of said resynchronization means providing a digital signal for each detected error.

2. Test equipment in accordance with claim 1, characterized in that the digital test signal generator means is comprised of means for creating a data reference line in which all of the binary elements are 1's, and the receiver means has means for detecting said reference line, and first means for evaluating the maximum value of the reference line level, said maximum value being used in a ramp generator means whose output determines the threshold of the said data regeneration circuit.

3. Test equipment in accordance with claim 1, characterized in that the receiver means is comprised of means to initially synchronize the sampling clock means with the received signal clock train of the said data test signal generator means.

4. Test equipment in accordance with claim 1 or 2, characterized in that the said ramp generator means is comprised of switching means for fixing the threshold level before the beginning of the ramp and after the end of the ramp to one half of the maximum value.

5. Equipment in accordance with any one of the claims 1 to 3, characterized in that the means to initially synchronize said sampling clock means with the clock train received from the data test signal generator means is comprised of a local clock means, means for generating impulses of a width equal to the delay between each local clock signal and each received clock signal, means for charging in parallel by a constant current generator two capacitors respectively having one lead connected to ground and one lead insulated, the insulated leads being interconnected via a diode, comparator means, the insulated lead of said two capacitors having the charging current applied directly thereto and also being connected to a first input of said comparator means, the insulated lead to which the charging current is applied through the diode being also connected to the input of a blocking sampler means whose output is connected to the other input of the comparator means, the means for generating the impulses being inhibited after a fixed number of the received clock signals are received, the output of the comparator means delivering an output signal when a first compared signal exceeds the second compared signal, the output signal of the comparator means thus being in phase with the received clock train.

6. Equipment in accordance with either one of the claims 2 or 3 characterized in that the ramp generator means is constituted by a digital line counter means whose outputs are connected to the corresponding inputs of a digital to analog converter means of which one analog reference input receives the maximum value of the reference line level and whose analog output is connected to the input of a linear amplifier having a gain which is greater than 1 and whose output provides a signal in the form of a ramp.

7. Equipment in accordance with claim 4, characterized in that the means to initially synchronize said sampling clock means with the clock train received from the data test signal generator means is comprised of a local clock means, means for generating impulses of a width equal to the delay between each local clock signal and each received clock signal, means for charging in parallel by a constant current generator two capacitors respectively having one lead connected to ground and one lead insulated, the insulated leads being interconnected via a diode, comparator means, the insulated lead of said two capacitors having the charging current applied directly thereto and also being connected to a first input of said comparator means, the insulated lead to which the charging current is applied through the diode being also connected to the input of a blocking sampler means whose output is connected to the other input of the comparator means, the means for generating the impulses being inhibited after a fixed number of the received clock signals are received, the output of the comparator means delivering an output signal when a first compared signal exceeds the second compared signal, the output signal of the comparator means thus being in phase with the received clock train.

8. Equipment in accordance with claim 4 characterized in that the ramp generator means is constituted by a digital line counter means whose outputs are connected to the corresponding inputs of a digital to analog converter means of which one analog reference input receives the maximum value of the reference line level and whose analog output is connected to the input of a linear amplifier having a gain which is greater than 1 and whose output provides a signal in the form of a ramp.

9. Equipment in accordance with claim 5 characterized in that the ramp generator means is constituted by a digital line counter means whose outputs are connected to the corresponding inputs of a digital to analog converter means of which one analog reference input receives the maximum value of the reference line level and whose analog output is connected to the input of a linear amplifier having a gain which is greater than 1 and whose output provides a signal in the form of a ramp.

* * * * *